(12) United States Patent
Cho et al.

(10) Patent No.: US 11,509,170 B2
(45) Date of Patent: Nov. 22, 2022

(54) WIRELESS POWER TRANSMISSION SYSTEM COMPRISING RECEPTION COIL HAVING CONSTANT PITCH

(71) Applicant: Electronics and Telecommunications Research Institute, Daejeon (KR)

(72) Inventors: In Kui Cho, Daejeon (KR); Sang-Won Kim, Daejeon (KR); Seong-Min Kim, Daejeon (KR); Jung Ick Moon, Daejeon (KR); Je Hoon Yun, Daejeon (KR); Ho Jin Lee, Daejeon (KR); Dong Won Jang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 263 days.

(21) Appl. No.: 16/629,010

(22) PCT Filed: Jul. 5, 2018

(86) PCT No.: PCT/KR2018/007628
§ 371 (c)(1),
(2) Date: Jan. 6, 2020

(87) PCT Pub. No.: WO2019/009639
PCT Pub. Date: Jan. 10, 2019

(65) Prior Publication Data
US 2020/0203994 A1 Jun. 25, 2020

(30) Foreign Application Priority Data

Jul. 6, 2017 (KR) .................. 10-2017-0086127
Jan. 10, 2018 (KR) .................. 10-2018-0003370

(51) Int. Cl.
*H02J 50/12* (2016.01)
*H01F 38/14* (2006.01)

(52) U.S. Cl.
CPC .............. *H02J 50/12* (2016.02); *H01F 38/14* (2013.01)

(58) Field of Classification Search
CPC ...... H02J 50/12; H01F 38/14; H01F 27/2871; H01F 27/306; H01F 27/323; H01P 11/008
See application file for complete search history.

(56) References Cited

U.S. PATENT DOCUMENTS 9,472,336 B2  10/2016  Jung
2012/0306280 A1*  12/2012  Krishna ............... H01P 11/008
                                                     307/104
2014/0021794 A1   1/2014  Kim et al.
(Continued)

FOREIGN PATENT DOCUMENTS

JP  2013080785 A * 5/2013
JP  2013080785 A   5/2013
(Continued)

*Primary Examiner* — Rexford N Barnie
*Assistant Examiner* — Elim Ortiz
(74) *Attorney, Agent, or Firm* — William Park & Associates Ltd.

(57) ABSTRACT

A wireless power receiving apparatus, according to an example embodiment, may include a receiving coil in which a first wire including a copper core and a second wire not including a copper core are wound around a same axis. The second wire may be located at a pitch of the first wire, and a diameter of the second wire may correspond to the pitch of the first wire.

20 Claims, 7 Drawing Sheets

(56) References Cited

U.S. PATENT DOCUMENTS

2017/0103849 A1* 4/2017 Leem .................. H01F 27/2871
2017/0155195 A1 6/2017 Yun et al.

FOREIGN PATENT DOCUMENTS

| JP | 2013146154 A | * | 7/2013 | .............. B60L 58/30 |
| JP | 2013146154 A | | 7/2013 | |
| KR | 101390954 B1 | | 4/2014 | |
| KR | 101395256 B1 | | 5/2014 | |
| KR | 1020140076994 A | | 6/2014 | |
| KR | 102017043393 A | | 4/2017 | |
| KR | 1020170068167 A | | 6/2017 | |

* cited by examiner

WIRELESS POWER TRANSMISSION SYSTEM COMPRISING RECEPTION COIL HAVING CONSTANT PITCH

TECHNICAL FIELD

The present invention relates to a wireless power transmission system.

BACKGROUND ART

In order to be applied to various devices, sizes of a wireless power transmitting apparatus and a wireless power receiving apparatus may be reduced. When the sizes of the wireless power transmitting apparatus and the wireless power receiving apparatus are reduced, densities of a transmitting coil and a receiving coil included in the wireless power transmitting apparatus and the wireless power receiving apparatus may increase. For example, when a receiving coil is inserted in a small device such as a smartphone, the receiving coil may be relatively more densely wound to acquire a high inductance in consideration of a space in the device. When the receiving coil is relatively more densely wound, a power receiving efficiency may decrease and heat may be generated. The heat generated in the receiving coil may reduce a magnitude of current output from the receiving coil, thereby hindering fast charging.

DISCLOSURE OF INVENTION

Technical Goals

An aspect of the present invention provides a receiving coil of a wireless power transmission system in a structure for improving a power reception efficiency and reducing an amount of generated heat energy.

Technical Solutions

According to an aspect, there is provided a wireless power receiving apparatus including a receiving coil in which a current based on a magnetic field formed by a transmitting coil of a wireless power transmitting apparatus flows, the receiving coil including a first wire including a copper core and a second wire located at a pitch of the first wire and not including a copper core, wherein the first wire and the second wire of the receiving coil are wound around a same center.

A diameter of the second wire may correspond to the pitch of the first wire.

A diameter of the second wire may correspond to N times a diameter of the first wire, N being an integer greater than 1.

A diameter of the first wire may be the same as a diameter of the second wire.

A diameter of the second wire may correspond to a diameter of the cooper core of the first wire.

The first wire and the second wire may be arranged on a same plane in the receiving coil.

The copper core of the first wire may be a ridge wire.

The second wire may be used to maintain the pitch of the first wire.

The pitch of the first wire may be associated with an internal resistance of the receiving coil.

The internal resistance may decrease as the pitch of the first wire increases.

According to another aspect, there is also provided a wireless power receiving apparatus including a receiving coil in which a current based on a magnetic field formed by a transmitting coil of a wireless power transmitting apparatus flows, wherein the receiving coil includes a first wire including copper core in which the current flows and a second wire configured to maintain a pitch of the first wire and not including the copper core.

A diameter of the second wire may correspond to the pitch of the first wire.

A diameter of the second wire may correspond to N times a diameter of the first wire, N being an integer greater than 1.

A diameter of the first wire may be the same as a diameter of the second wire.

A diameter of the second wire may correspond to a diameter of the copper core of the first wire.

The first wire and the second wire may be arranged on a same plane in the receiving coil.

The copper core of the first wire may be a ridge wire.

The second wire may be used to maintain the pitch of the first wire.

The pitch of the first wire may be associated with an internal resistance of the receiving coil.

The internal resistance may decrease as the pitch of the first wire increases.

Effects

According to example embodiment, it is possible to provide a receiving coil of a wireless power transmission system in a structure for improving a power reception efficiency and reducing an amount of generated heat energy.

BEST MODE FOR CARRYING OUT THE INVENTION

Detailed example embodiments of the inventive concepts are disclosed herein. However, specific structural and functional details disclosed herein are merely representative for purposes of describing example embodiments of the inventive concepts. Example embodiments of the inventive concepts may, however, be embodied in many alternate forms and should not be construed as limited to only the embodiments set forth herein.

While example embodiments of the inventive concepts are capable of various modifications and alternative forms, embodiments thereof are shown by way of example in the drawings and will herein be described in detail. It should be understood, however, that there is no intent to limit example embodiments of the inventive concepts to the particular forms disclosed, but to the contrary, example embodiments of the inventive concepts are to cover all modifications, equivalents, and alternatives falling within the scope of example embodiments of the inventive concepts.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the inventive concepts. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, example embodiments will be described in detail with reference to the accompanying drawings. It should be understood, however, that there is no intent to limit this disclosure to the particular example embodiments disclosed. Like numbers refer to like elements throughout the description of the figures.

Figure 1:
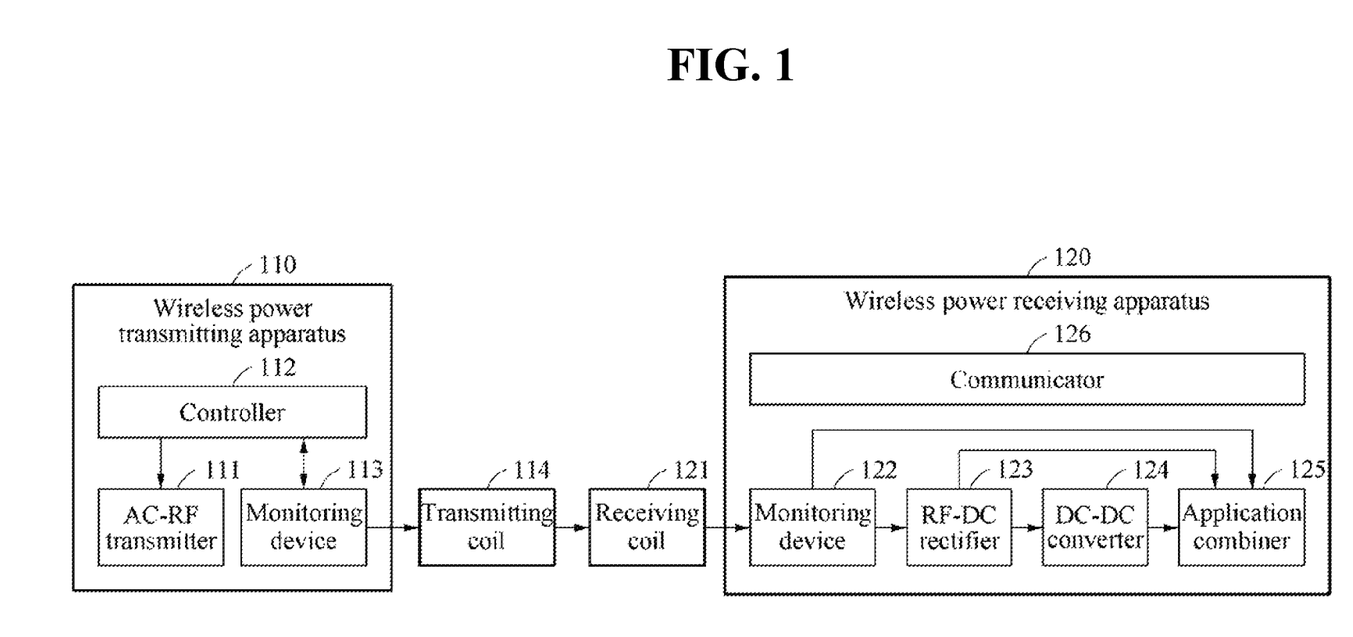
FIG. 1 is a diagram illustrating a wireless power transmitting apparatus and a wireless power receiving apparatus according to an example embodiment.

FIG. 1 is a diagram illustrating a wireless power transmitting apparatus 110 and a wireless power receiving apparatus 120 according to an example embodiment.

The wireless power transmitting apparatus 110 may be an apparatus for supplying power to the wireless power receiving apparatus 120, which is not physically connected to the wireless power transmitting apparatus 110, using a wire. The wireless power receiving apparatus 120 may provide the power received from the wireless power transmitting apparatus 110, to a load connected to the wireless power receiving apparatus 120. To supply the power to the wireless power receiving apparatus 120, the wireless power transmitting apparatus 110 may generate a magnetic field in a space including the wireless power receiving apparatus 120. The wireless power transmitting apparatus 110 may convert power received from an external power source, for example, a battery and a common alternating current (AC) power source, into the magnetic field.

Referring to FIG. 1, in order to generate the magnetic field in the space including the wireless power receiving apparatus 120, the wireless power transmitting apparatus 110 may include an AC-radio frequency (RF) transmitter 111, a controller 112, a monitoring device 113, and a transmitting coil 114. The wireless power transmitting apparatus 110 may use the AC-RF transmitter 111 to convert an input AC signal, for example, a common AC power into an RF signal used for generating the magnetic field in the transmitting coil 114. To convert the AC signal into the RF signal, the AC-RF transmitter 111 may include an inverter. The wireless power transmitting apparatus 110 may use the monitoring device 113 to input the RF signal to the transmitting coil 114, or perform impedance matching or status tracking on the transmitting coil 114. The wireless power transmitting apparatus 110 may use the controller 112 to control the AC-RF transmitter 111 and the monitoring device 113. Furthermore, the wireless power transmitting apparatus 110 may use the controller 112 to control power efficiency and control a frequency of the RF signal.

The wireless power transmitting apparatus 110 and the wireless power receiving apparatus 120 may use the RF signal to wirelessly transmit and receive power. Thus, the wireless power transmitting apparatus 110 and the wireless power receiving apparatus 120 may include a complex radio circuit including a circuit to which direct current (DC)/RF conversion technology or RF/DC conversion technology is applied.

In response to the RF signal being input to the transmitting coil 114, the magnetic field may be formed in a space adjacent to the transmitting coil 114. When the wireless power receiving apparatus 120 is located in the space adjacent to the transmitting coil 114, the wireless power receiving apparatus 120 may include a receiving coil 121 in which a current due to the magnetic field generated by the transmitting coil 114 flows. The receiving coil 121 may have an antenna structure or a loop structure to receive a magnetic field for power supply and data transmission.

The wireless power transmitting apparatus 110 and the wireless power receiving apparatus 120 may transmit the power using magnetic resonance or magnetic induction. When the receiving coil 121 is located in the space adjacent to the transmitting coil 114, for example, a space in which the magnetic field generated by the transmitting coil 114 is present, a current induced by the magnetic field generated in the transmitting coil 114 may flow to the receiving coil 121. Also, a magnetic resonance due to the magnetic field generated in the transmitting coil 114 may occur in the receiving coil 121 whereby the current flows in the receiving coil 121. The current flowing in the receiving coil 121 may be an AC of which a magnitude changes on a time-by-time basis.

The wireless power receiving apparatus 120 may include a monitoring device 122 that monitors the AC flowing in the receiving coil 121 or perform the impedance matching. The wireless power receiving apparatus 120 may include an RF-DC rectifier 123 that converts the AC output from the receiving coil 121 into a DC. The wireless power receiving apparatus 120 may include a DC-DC converter 124 that changes an amount of DC into which the AC is converted in the RF-DC rectifier 123. The wireless power receiving apparatus 120 may include an application combiner 125 that changes the DC based on a load, to supply power acquired from the receiving coil 121 to an external load, for example, a circuit using the acquired power. The wireless power receiving apparatus 120 may also include a communicator 126 that performs communication using the magnetic field between the transmitting coil 114 and the receiving coil 121.

While the power is supplied from the wireless power transmitting apparatus 110 to the wireless power receiving apparatus 120, heat may be generated in an inverter included in the wireless power transmitting apparatus 110, the RF-DC rectifier 123, and the receiving coil 121. The heat generated in the receiving coil 121 may reduce an efficiency of the wireless power receiving apparatus 120 receiving the power. The receiving coil 121 of the wireless power receiving apparatus 120 may have a structure for reducing or preventing the heat generated in the receiving coil 121. In other words, the receiving coil 121 may be designed to solve a heating issue that occurs in a wireless power transmission process.

Figure 2:
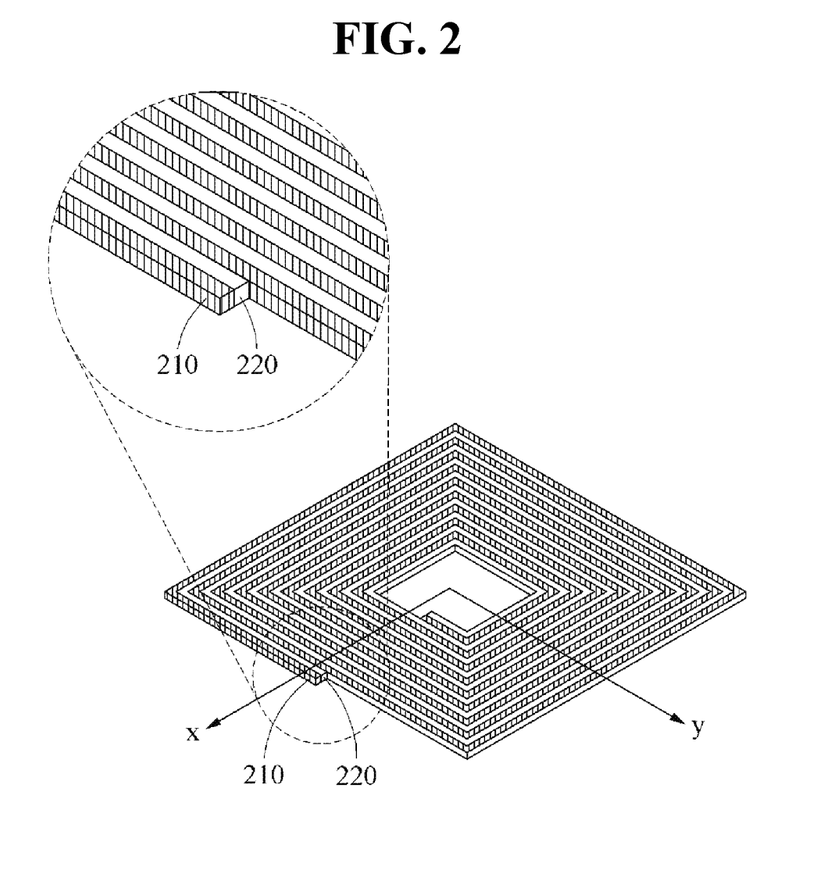
FIG. 2 is a diagram illustrating a receiving coil of a wireless power receiving apparatus according to an example embodiment.

FIG. 2 is a diagram illustrating a receiving coil of a wireless power receiving apparatus according to an example embodiment.

A receiving coil may include a first wire 210 and a second wire 220. The first wire 210 may include a copper core. The copper core included in the first wire 210 may be a twisted ridge wire with a plurality of wires enameled with ultra-fine lines, for example, a conductor wire having a diameter of 0.04 millimeters (mm) to 0.05 mm. A current based on a magnetic field generated by a transmitting coil of a wireless power transmitting apparatus may flow in the first wire 210. The second wire 220 may not include the copper core. Furthermore, the second wire 220 may be a fake wire without losses. Thus, the current based on the magnetic field generated by the transmitting coil may not flow in the second wire 220.

Referring to FIG. 2, the receiving coil may have a spiral structure in which the first wire 210 and the second wire 220 are wound on the same plane based on the same center. The receiving coil having the spiral structure may be applied to a two-dimensional (2D) pad that is to be integrated in a circuit. In terms of a wire included in the transmitting coil or the receiving coil, a space between the wound wires is referred to as a pitch. In FIG. 2, when the first wire 210 and the second wire 220 are located on the same plane, the second wire 220 may be located at a pitch of the first wire 210 and the first wire 210 may be located at a pitch of the second wire 220.

The second wire 220 may be used to adjust the pitch of the first wire 210. As illustrated in FIG. 2, since the second wire 220 is located at the pitch of the first wire 210, the pitch of the first wire 210 may be maintained in a predetermined size by the second wire 220. The pitch of the first wire 210 may be accurately adjusted without increasing a width and a size of the wireless power receiving apparatus.

When the current based on the magnetic field generated by the transmitting coil flows in the first wire 210, heat may be generated in the first wire 210. An amount of heat generated in the first wire 210 may be associated with the pitch of the first wire 210. In a vicinity of the first wire 210, a density of the current flowing in the first wire 210 may cause the heat to be generated in the first wire 210.

Figure 3:
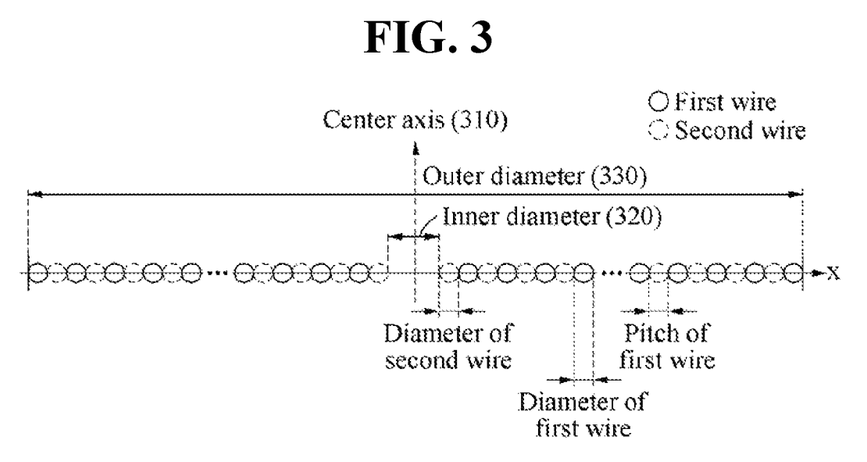
FIG. 3 is a cross-sectional view illustrating the receiving coil of FIG. 2.

FIG. 3 is a cross-sectional view illustrating the receiving coil of FIG. 2. FIG. 3 illustrates an x-axial cross section of the receiving coil of FIG. 2. A first wire and a second wire may be simultaneously wound about a same center axis 310. An inner diameter 320 of the receiving coil may be a space including a center axis, and indicate a diameter of an empty space in which the first wire and the second wire are absent in the receiving coil. An outer diameter 330 of the receiving coil may be a diameter of an outermost wire of the first wire and the second wire wound in the receiving coil. The diameter of the first wire or the second wire may be a diameter of an object, for example, a ridge wire in a case of the first wire, included in the first wire or the second wire.

Referring to FIG. 3, the first wire and the second wire may be simultaneously wound around the same center axis 310, so that the second wire is located at the pitch of the first wire. When the first wire and the second wire are densely wound at the same time, the diameter of the second wire may correspond to the pitch of the first wire. In this case, the second wire may be used to maintain or adjust the pitch of the first wire. For example, when the diameter of the second wire is the same as the diameter of the first wire, the pitch of the first wire may be the same as the diameter of the first wire.

The diameter of the second wire may correspond to N times the diameter of the first wire, N being an integer greater than 1. In this case, since the second wire is located at the pitch of the first wire, the pitch of the first wire may be N times the diameter of the first wire. For example, the diameter of the second wire may be two or three times the diameter of the first wire. Also, the diameter of the second wire may be smaller than the diameter of the first wire. The diameter of the second wire may be determined based on a relationship between a thermal energy generated in the receiving coil and the pitch of the first wire.

When the first wire including the copper core and the second wire no including the copper core are densely wound at the same time, the thermal energy generated in the receiving coil may be reduced without increasing a size of the receiving coil. When a current flows in the first wire including the copper core, an amount of thermal energy generated in the receiving coil may vary based on a current density in the first wire.

Figure 4:
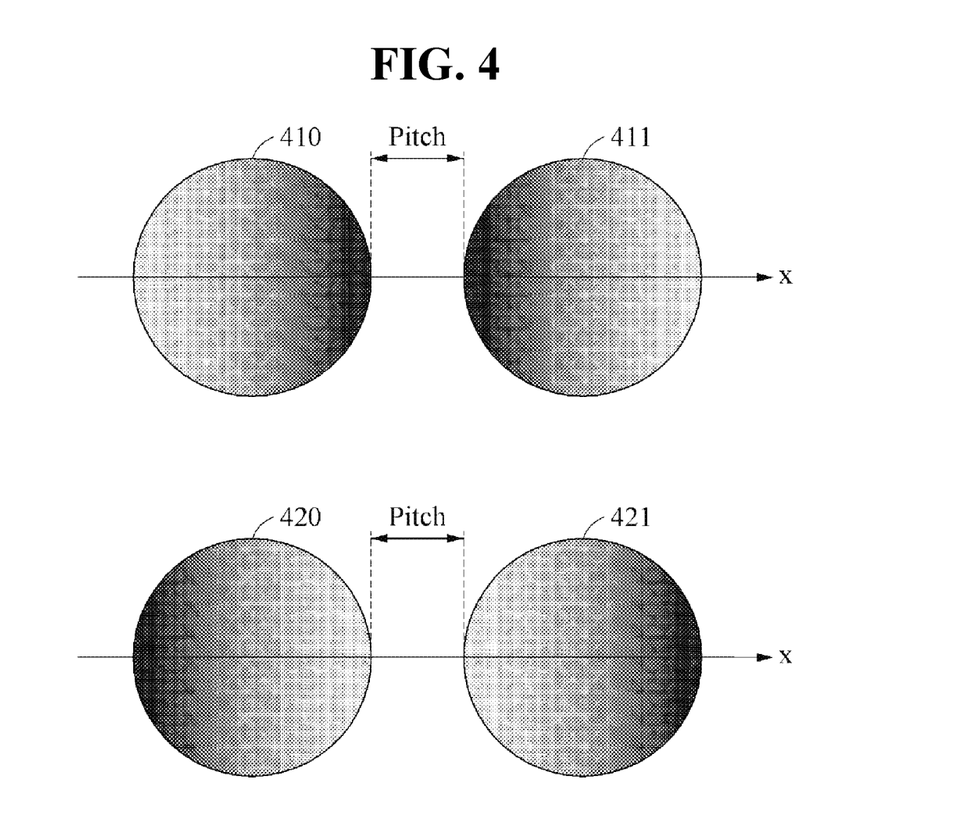
FIG. 4 is a diagram illustrating a current density in a first wire based on a direction of a current flowing in the first wire of a receiving coil according to an example embodiment.

FIG. 4 is a diagram illustrating a current density in a first wire based on a direction of a current flowing in the first wire of a receiving coil according to an example embodiment. In FIG. 4, a structure of a receiving coil including a first wire may be a spiral structure as described with reference to FIG. 2. For brevity of description, a second wire is not shown in the drawing.

FIG. 4 illustrates cross-sections 410, 411, 420, and 421 of a copper core included in a first wire at intervals of a pitch adjusted by a second wire. When a current generated by a magnetic field of a transmitting coil flows in the first wire, a current density may vary in the first wire due to a shape of the first wire. The current density in the first wire may vary based on a frequency, a direction, and a magnitude of the current flowing in the first wire.

A phenomenon that a current density in the first wire varies based on a frequency, a direction, and a magnitude of current flowing in the first wire may be referred to as a proximity effect. A skin effect may be one of the proximity effect. The skin effect may be a phenomenon that a current density in a conductor varies based on an arrangement of the conductor when conductors, for example, the copper core included in the first wire, in which a current flows are parallel to one another. As the frequency of the current flowing in the conductor increases and an interval, for example, the pitch of the first wire between parallel conductors decreases, a degree of the proximity effect or the skin effect may increase. The proximity effect or the skin effect may also occur in a bent portion of the first wire. The proximity effect or the skin effect may increase an AC resistance, which may lead to a loss of current.

As the degree of the proximity effect or the skin effect increases, a uniformity of distribution of the current flowing in the first wire may decrease. Referring to FIG. 4, when the first wire is wound such that current flows in the cross-sections 410 and 411 in opposite directions (for example, in a case in which the current flows in the cross-section 410 in a direction to pass a sheet and which the current flows in the cross-section 411 in an opposite direction), the current flowing in the cross-sections 410 and 411 may be concentrated in a direction in which the cross-sections 410 and 411 face each other. Thus, a current density of an area of the cross-sections 410 and 411 adjacent to the pitch may increase.

Referring to FIG. 4, when the first wire is wound such that current flows in the cross-sections 420 and 421 in the same direction (for example, in a case in which the current flows in the cross-sections 420 and 421 in the direction to pass a sheet), the current flowing in the cross-sections 420 and 421 may be concentrated in a direction opposite to a direction in which the cross-sections 420 and 421 face each other. Thus, a current density of an area of the cross-sections 420 and 421 on an opposite side of the pitch may increase.

When the current density is concentrated in one of the cross-sections 410, 411, 420, and 421, a flow of the current through the cross-sections 410, 411, 420, and 421 may be disturbed. When the flow of the current is disturbed, an internal resistance of the first wire may increase. The receiving coil may alleviate the proximity effect or the skin effect occurring in the first wire by adjusting the pitch of the first wire using the second wire. When the proximity effect or the skin effect occurring in the first wire is alleviated, the internal resistance of the first wire may not increase. Since the internal resistance of the first wire does not increase, a power receiving efficiency of the receiving coil may be improved.

Figure 5:
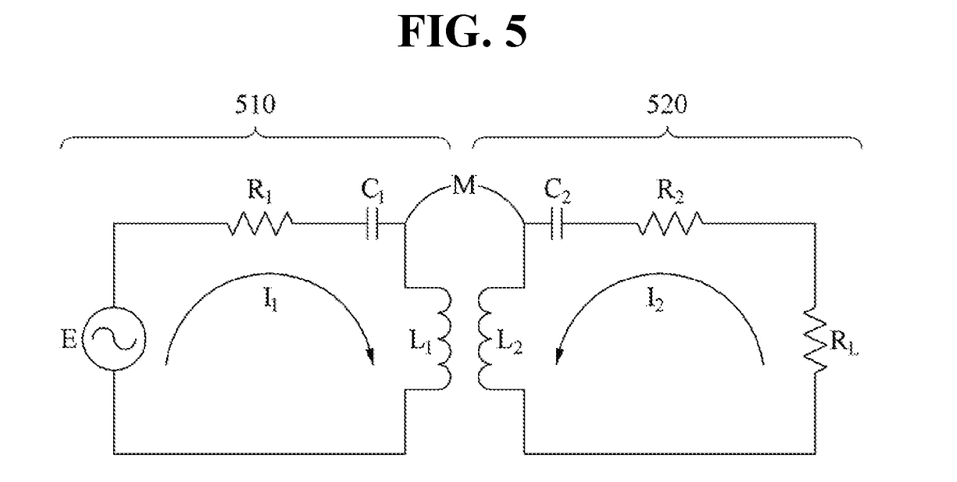
FIG. 5 is a diagram illustrating an equivalent circuit of a wireless power transmitting apparatus and a wireless power receiving apparatus according to an example embodiment.

The aforementioned proximity effect or skin effect may be modeled based on an equivalent circuit. FIG. 5 is a diagram illustrating an equivalent circuit of a wireless power transmitting apparatus 510 and a wireless power receiving apparatus 520 according to an example embodiment. Referring to FIG. 5, a transmitting coil and a receiving coil of the wireless power receiving apparatus 520 and the wireless power transmitting apparatus 510 may be modeled based on two inductors (having inductance L1 and L2 and a mutual inductance M) and parasitic resistances R1 and R2 connected to the two inductors, respectively. The parasitic resistance R1 and the parasitic resistance R2 may correspond to an internal resistance of a coil. The aforementioned proximity effect or skin effect may increase the parasitic resistance R1 or the parasitic resistance R2. Thus, the parasitic resistance R1 or the parasitic resistance R2 may vary based on structures of the transmitting coil and the receiving coil.

When modeling a load connected to the wireless power receiving apparatus 520 using a resistance $R_L$, a wireless power transmission efficiency may be determined based on a ratio between power $P_L$ of the resistance $R_L$ and power $P_{IN}$ supplied by the wireless power transmitting apparatus 510. For example, a wireless power transmission efficiency $\eta$ may be determined using Equation 1.

$$\eta = \frac{P_L}{P_{IN}} = \frac{(I_2)^2 R_L}{RE[I_1]E} = \frac{1}{\left(\frac{R_1 R_2}{(\omega M)^2}\left(\frac{R_L}{R_2}+1\right)+1\right)\left(1+\frac{R_2}{R_1}\right)}$$ [Equation 1]

-continued $$\begin{cases} (I_2)^2 R_L = \dfrac{E^2(\omega M)^2 R_L}{|Z_1(R_L+Z_2)+(\omega M)^2|^2} \\ RE[I_1]E = \dfrac{E^2 RE(R_L+Z_2)}{RE(Z_1(R_L+Z_2)+(\omega M)^2)} \end{cases}$$

From Equation 1, it can be known that the parasitic resistance R1 and the parasitic resistance R2 are reduced to improve the wireless power transmission efficiency $\eta$. Specifically, the parasitic resistance R2 associated with the secondary coil may be reduced. Also, the wireless power transmission efficiency $\eta$ may be closely related to hear generation. For example, the parasitic resistance R1 and the parasitic resistance R2 may increase based on structures of the transmitting coil and the receiving coil. In this example, the wireless power transmission efficiency $\eta$ may decrease.

As described above, the receiving coil of the wireless power receiving apparatus 520 may include the second wire to maintain the pitch of the first wire including the copper core so that the parasitic resistance R2 has a relatively small value. Since the parasitic resistance R2 has a relatively small value, the wireless power transmission efficiency $\eta$ may be improved and an amount of thermal energy generated in the wireless power receiving apparatus 520 may be reduced.

Table 1 shows a magnitude of current flowing in the receiving coil of the wireless power receiving apparatus 520 and a temperature (for example, an amount of thermal energy) of the receiving coil through experimental measurement performed based on a structure of the receiving coil.

TABLE 1

| | Coil characteristic | Coil structure | Efficiency | Temperature characteristic | Note |
|---|---|---|---|---|---|
| Transmitting coil | Turns: 10<br>L = 5.5 uH<br>Q = 85 | — | — | — | — |
| Case 1 | Turns: 17<br>L = 11.7 uH<br>Q = 32 | Manufactured using general copper core without second wire | 68.0%<br>64.8% | 41.6° C.<br>75.3° C. | $I_{out}$ = 0.85 A<br>$I_{out}$ = 1.50 A |
| Case 2 | Turns: 17<br>L = 13.3 uH<br>Q = 43.2 | Manufactured using ridge wire as first wire without second wire | 73.1%<br>63.0% | 40.6° C.<br>63.3° C. | $I_{out}$ = 0.85 A<br>$I_{out}$ = 1.50 A |
| Case 3 | Turns: 9<br>L = 3.58 uH<br>Q = 23.2 | Manufactured using ridge wire as first wire and second wire | 72.2%<br>70.1% | 37.8° C.<br>54.4° C. | $I_{out}$ = 0.85A<br>$I_{out}$ = 1.50 A |
| Case 4 | Turns: 11<br>L = 3.64 uH<br>Q = 21.8 | Manufactured using ridge wire as first wire and second wire, the first wire and the second wire being wound so as to have relatively small diameter | 67.8%<br>66.7% | 42.8° C.<br>55.2° C. | $I_{out}$ = 0.85 A<br>$I_{out}$ = 1.50 A |

As shown in Table 1, the transmitting coil has 10 turns, an inductance value of 5.5 μm, and 85 as a Q value. Case 1 through Case 4 of Table 1 represent measured results and structures of four different receiving coils corresponding to the transmitting coil. Case 1 may correspond to a receiving coil having a general coil structure, for example, a receiving coil manufactured by winding a general copper line without using a second wire. Case 2 may correspond to a receiving coil with a ridge wire instead of the cooper line used for the receiving coil of Case 1. Case 3 and Case 4 may each correspond to the aforementioned receiving coil including the second wire for maintaining the pitch of the first wire. In Case 3 and Case 4, the second wire may be arranged at the pitch of the first wire in consideration of the proximity effect or the skin effect. In Table 1, the temperature characteristics are measured ten minutes after the transmitting coil and the receiving coil operate.

In Case 1, the pitch of the receiving coil having the general coil structure may converge onto zero in response to the copper line being densely wound. Case 2, which corresponds to the receiving coil with the ridge wire instead of the cooper line used for the receiving coil of Case 1, represents an experiment result of the receiving coil having 17 turns similarly to the coil structure of Case 1. As shown in Table 1, the receiving coil of Case 2 may have an inductance value of 13.3 µH and a Q value of 43.2. The receiving coil of Case 3 may correspond to the receiving coil with the ridge wire wound with nine turns. Also, the receiving coil of Case 3 may have an inductance value of 3.58 uH and a Q value of 21.4. In Case 1 through Case 4, the receiving coils may have the same outer diameters. In Case 3 and Case 4, the pitch of the receiving coil may be determined based on a diameter level of the ridge wire. For example, in Case 3 and Case 4, the diameter of the second wire of the receiving coil may correspond to the diameter of the ridge wire. In Case 4, the receiving coil may have a structure with two more turns around an inner diameter and thus, the inner diameter may be relatively small. The receiving coils of Case 3 and Case 4 may be different in that the first wires are wound with 9 turns and 11 turns, respectively.

In Cases 1 through 4, values of the resistance R2 in the receiving coils may be respectively 0.270817 ohms (Ω), 0.321621 Ω, 0.135738 Ω, and 0.146877 Ω. In this example, the receiving coil of Case 3 may have the smallest internal resistance. In Case 1, the receiving coil (for example, a receiving coil used for wireless charging in general) may have a temperature of 41.6° C. and an efficiency of 68% at a load of 0.85 amperes (A). In Case 3, the receiving coil may have a temperature of 37.8 degrees Celsius (° C.) at the load of 0.85 A and thus, less heat energy may be generated when compared to the receiving coil of Case 1. Comparing the receiving coil of Case 3 having the temperature of 54.4° C. at a load of 1.5 A to the receiving coil of Case 1, the temperature may decrease from 75.3° C. to 54.4° C. and thus, the receiving coil of Case 3 with the smaller internal resistance may have an excellent temperature characteristic.

When the receiving coil of Case 3 or Case 4 is compared to the receiving coil of Case 1 or Case 2 in consideration of the proximity effect, a receiving coil having a relatively small internal resistance, for example, a relatively large pitch may have more excellent temperature characteristic. When a relatively large current flows in the receiving coil for fast charging, a structure of the receiving coil may be a more significant factor causing the heat generation.

Figure 6:
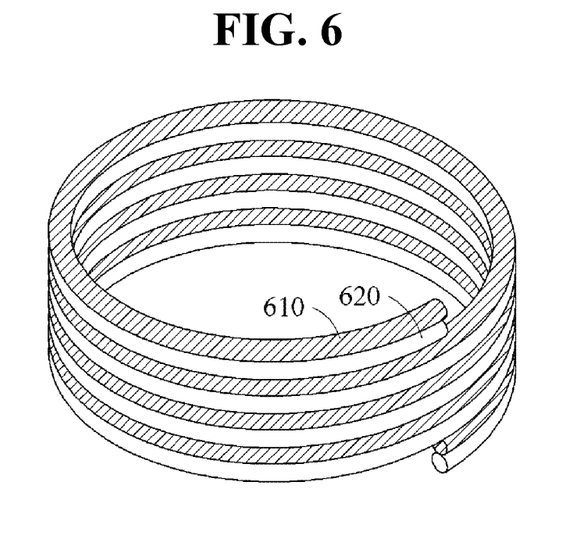
FIG. 6 is a diagram illustrating a receiving coil of a wireless power receiving apparatus according to an example embodiment.

FIG. 6 is a diagram illustrating a receiving coil of a wireless power receiving apparatus according to an example embodiment. In addition to the spiral structure of FIG. 2, a receiving cool may have a helical structure in which a first wire 610 and a second wire 620 included in the receiving coil are spirally wound. As described above, the first wire 610 may include a copper core in which a current generated by a magnetic field formed around the receiving coil flows, and the second wire 620 may not include the copper core.

Referring to FIG. 6, the receiving coil may be formed by winding the first wire 610 and the second wire 620 about the same center. The second wire 620 may be located at a pitch of the wound first wire 610. A diameter of the second wire 620 may correspond to a diameter of the first wire or a diameter of the copper core, for example, a ridge wire included in the first wire. In this case, a size of the pitch of the first wire 610 may be the same as the diameter of the second wire 620, for example, the diameter of the first wire or the diameter of the copper core of the first wire.

The diameter of the second wire 620 may be N times the diameter of the first wire 610, N being an integer greater than 1. In this case, since the second wire 620 is located in the first wire 610, the pitch of the first wire 610 may be N times the diameter of the second wire 620. For example, the diameter of the second wire 620 may be two or three times the diameter of the first wire 610. The diameter of the second wire 620 may also be smaller than the diameter of the first wire 610. The diameter of the second wire 620 may be determined based on a relationship between the pitch of the first wire 610 and a thermal energy generated in the receiving coil. For example, the diameter of the second wire 620 may be determined based on a relationship between the pitch of the first wire 610 and the parasitic resistance R2 of Equation 1.

The receiving coil may include the second wire 620 located at the pitch of the first wire 610 to maintain the pitch of the first wire 610, whereby a proximity effect or a skin effect occurring in the first wire 610 including the copper core is alleviated. When the proximity effect or the skin effect occurring in the first wire 610 is alleviated, a parasitic resistance of the receiving coil may decrease. When the parasitic resistance of the receiving coil decreases, an amount of thermal energy generated in the receiving coil may be reduced and thus, a wireless power transmission efficiency of the receiving coil may be improved.

As such, by densely winding the first wire 610 including the copper core and the second wire 620 not including the copper core at the same time, the receiving coil may solve an issue that an internal resistance or a parasitic resistance of the receiving coil increases due to the proximity effect or the skin effect while preventing an increase of the size of the receiving coil. When a small device such as a smartphone wirelessly transmits power, a heat generation and degradation in transmission efficiency may occur as the size of the receiving coil included in the small device is reduced. A Q value of a resonator included in each of a wireless power transmitting apparatus and a wireless power receiving apparatus may affect the wireless power transmission efficiency. For example, the internal resistance of the receiving coil corresponding to a secondary resonant coil may affect the wireless power transmission efficiency. The internal resistance of the receiving coil may be determined based on the proximity effect or the skin effect. Thus, the receiving coil may alleviate the proximity effect and the skin effect using the second wire 620, thereby reducing the internal resistance of the receiving coil and improving the wireless power transmission efficiency.

Figure 7:
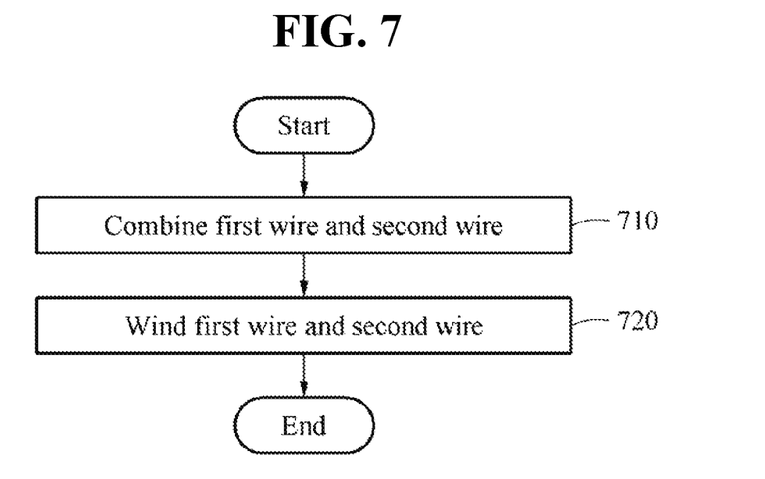

FIG. 7 is a flowchart illustrating a method of manufacturing a receiving coil of a wireless power receiving apparatus according to an example embodiment.

Referring to FIG. 7, in operation 710, the method may combine a first wire including a copper core and a second wire not including the copper core. A diameter of the second wire may correspond to a diameter of the first wire or the copper core included in the first wire. The copper core of the first wire may be a ridge wire. The second wire may be a fake wire without an loss and may not include the copper core.

In FIG. 7, in operation 720, the method may wind the first wire combined with the second wire about a same center. When the first wire and the second wire are wound about the same center on a plane, the wound first wire and second wire may have a spiral structure. When the first wire and the second wire are wound while maintained in a predetermined distance from the center, the wound first wire and second wire may have a helical structure. The first wire and the second wire are combined and wound whereby the second wire is located at a pitch of the first wire. Likewise, the first wire may be located at a pitch of the second wire.

Through this, the pitch of the first wire or the second wire may be maintained as a predetermined value. For example, the pitch of the first wire may correspond to a diameter of the second wire. Also, the pitch of the second wire may correspond to a diameter of the first wire. When the pitch of the first wire is maintained as a predetermined value, a proximity effect and a skin effect occurring in the wound first wire may be alleviated. Thus, a parasitic resistance of the receiving coil may have a relatively small value, and a relatively little thermal energy may be generated. Furthermore, a wireless power transmission efficiency of the receiving coil may be improved.

The components described in the exemplary embodiments of the present invention may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the exemplary embodiments of the present invention may be achieved by software, and the software may be recorded on a recording medium. The components, the functions, and the processes described in the exemplary embodiments of the present invention may be achieved by a combination of hardware and software.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

The invention claimed is:

1. A wireless power receiving apparatus comprising:
a receiving coil in which a current based on a magnetic field formed by a transmitting coil of a wireless power transmitting apparatus flows, the receiving coil comprising a first wire including a copper core and a second wire located at a pitch of the first wire and not including a copper core,
wherein the first wire and the second wire of the receiving coil are wound around a same center; and
wherein a diameter of the second wire is determined based on a relationship between a thermal energy generated in the receiving coil and the pitch of the first wire.

2. The wireless power receiving apparatus of claim 1, wherein the diameter of the second wire corresponds to the pitch of the first wire.

3. The wireless power receiving apparatus of claim 1, wherein the diameter of the second wire corresponds to N times a diameter of the first wire, N being an integer greater than 1.

4. The wireless power receiving apparatus of claim 1, wherein a diameter of the first wire is the same as the diameter of the second wire.

5. The wireless power receiving apparatus of claim 1, wherein the diameter of the second wire corresponds to a diameter of the cooper core of the first wire.

6. The wireless power receiving apparatus of claim 1, wherein the first wire and the second wire are arranged on a same plane in the receiving coil.

7. The wireless power receiving apparatus of claim 1, wherein the copper core of the first wire is a ridge wire.

8. The wireless power receiving apparatus of claim 1, wherein the second wire is used to maintain the pitch of the first wire.

9. The wireless power receiving apparatus of claim 8, wherein the pitch of the first wire is associated with an internal resistance of the receiving coil.

10. The wireless power receiving apparatus of claim 9, wherein the internal resistance decreases as the pitch of the first wire increases.

11. A wireless power receiving apparatus comprising:
a receiving coil in which a current based on a magnetic field formed by a transmitting coil of a wireless power transmitting apparatus flows,
wherein the receiving coil comprises a first wire including copper core in which the current flows and a second wire configured to maintain a pitch of the first wire and not including the copper core; and
wherein a diameter of the second wire is determined based on a relationship between a thermal energy generated in the receiving coil and the pitch of the first wire.

12. The wireless power receiving apparatus of claim 11, wherein the diameter of the second wire corresponds to the pitch of the first wire.

13. The wireless power receiving apparatus of claim 11, wherein the diameter of the second wire corresponds to N times a diameter of the first wire, N being an integer greater than 1.

14. The wireless power receiving apparatus of claim 11, wherein a diameter of the first wire is the same as the diameter of the second wire.

15. The wireless power receiving apparatus of claim 11, wherein the diameter of the second wire corresponds to a diameter of the copper core of the first wire.

16. The wireless power receiving apparatus of claim 11, wherein the first wire and the second wire are arranged on a same plane in the receiving coil.

17. The wireless power receiving apparatus of claim 11, wherein the copper core of the first wire is a ridge wire.

18. The wireless power receiving apparatus of claim 11, wherein the second wire is used to maintain the pitch of the first wire.

19. The wireless power receiving apparatus of claim 18, wherein the pitch of the first wire is associated with an internal resistance of the receiving coil.

20. The wireless power receiving apparatus of claim 19, wherein the internal resistance decreases as the pitch of the first wire increases.

* * * * *